United States Patent Office 3,354,140
Patented Nov. 21, 1967

---

3,354,140
METAL-CONTAINING REACTIVE MONOAZO DYE-STUFFS CONTAINING A TRIAZINE GROUP
Jakob Benz, Oberwil, Basel-Land, and Hanspeter Uehlinger, Basel, Switzerland, assignors to Sandoz Ltd. (also known as Sandoz AG), Basel, Switzerland
No Drawing. Filed Dec. 11, 1964, Ser. No. 417,840
Claims priority, application Switzerland, Apr. 10, 1959, 71,848/59
7 Claims. (Cl. 260—146)

ABSTRACT OF THE DISCLOSURE

1:2-chromium and 1:2-cobalt complex compounds of monoazo dyestuffs of the formula

[chemical structure]

wherein w is hydrogen or chlorine,
y is hydrogen, chlorine or nitro,
z is hydrogen, chlorine, bromine or nitro, at least one of $w$, $y$ and $z$ being different from hydrogen,
R is a monohalo-1,3,5-triazinyl-2-radical, and
n is 1 or 2, are excellently suitable for dyeing, padding or printing fibers of natural cellulose or of regenerated cellulose.

---

This application is a continuation-in-part of our application Ser. No. 297,670, filed July 25, 1963 (and abandoned since the filing of the present application) and relates to the 1:2 chromium and 1:2 cobalt complex compounds of the monoazo dyestuffs of the formula

[chemical structure (I)]

wherein hal represents chlorine or bromine,
X represents amino, lower alkylamino, di-(lower alkyl)-amino, lower hydroxyalkylamino, di-(lower hydroxyalkyl)-amino, lower alkoxyloweralkylamino, lower carboxyalkylamino, N-lower alkyl-N-lower carboxyalkylamino, lower sulfoalkylamino, N-lower alkyl-N-lower sulfoalkylamino, phenylamino-, N-lower alkyl-N-phenylamino, N-lower hydroxyalkyl-N-phenylamino, carboxyphenylamino, monosulfophenylamino, disulfophenylamino, monosulfonaphthylamino, disulfonaphthylamino, lower alkylphenylamino, lower alkoxyphenylamino, chlorophenylamino, cyclohexylamino, methylcyclohexylamino or benzylamino,
w represents hydrogen or chlorine,
y represents hydrogen, chlorine or nitro,
z represents hydrogen, chlorine, bromine or nitro, at least one of $w$, $y$ and $z$ being different from hydrogen and
n is one of the integers 1 and 2, the group

[chemical structure]

is attached to the naphthalene nucleus in one of the positions 7 and 8 and the —NH— group is attached to one of the positions 3' and 4' of the phenylene nucleus.

The term "lower" in lower alkyl, lower hydroxyalkyl, lower alkoxyalkyl, lower carboxyalkyl and lower sulfoalkyl means containing 1 to about 5 carbon atoms; e.g. lower alkyl extends from methyl to amyl and also encompasses the branched isomers. However the preferred meanings are:

for lower alkyl—methyl, ethyl;
for loyer hydroxyalkyl—β-hydroxyethyl, β- or γ-hydroxypropyl;
for lower alkoxyalkyl—β-methoxy- or β-ethoxyethyl; γ-methoxypropyl;
for lower carboxyalkyl—carboxymethyl, β-carboxyethyl;
for lower sulfoalkyl—β-sulfoethyl, γ-sulfopropyl and β-hydroxy-γ-sulfopropyl.

A series of especially valuable dyestuffs comprises the 1:2-chromium and 1:2-cobalt complex compounds of the dyestuffs of the formula

[chemical structure (II)]

wherein

X and hal have the above-defined meanings,
each of $R_1$, $R_2$ and $R_3$ is independently chlorine or nitro, only one of $R_1$ and $R_2$ being nitro, and
m is one of the integers 1 and 2.

The production of the new chromium- or cobalt-containing dyestuffs consists in reacting with each other
1 mole of the diazo compound of a 2-amino-1-hydroxybenzene of the formula

[chemical structure (III)]

1 mole of a coupling component of the formula

[chemical structure (IV)]

wherein H represents an exchangeable hydrogen atom, and 1 mole of a reactive component of the formula

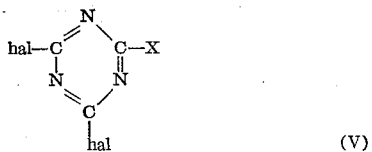

the reaction being conducted in such a manner that the diazo compound is introduced into the position ortho to —OH of the coupling component and the radical

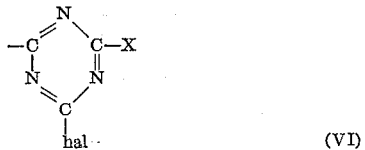

replaces the hydrogen atom H of the coupling component, hydrogen halide being set free; during or after the formation of the dyestuffs they are treated with a chromium- or cobalt-yielding agent. A suitable procedure is as follows: 1 mole of a monoazo dyestuff of the formula

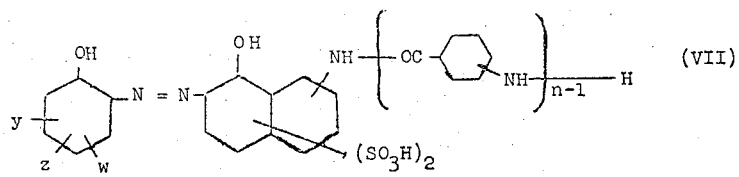

1 mole of a reactive compound of the Formula V and a chromium- or cobalt-yielding agent are reacted with each other so that the reactive compound of the Formula V reacts with the exchangeable hydrogen atom of the monoazo dyestuff (VII) and the chromium- or cobalt-yielding agent reacts with the ortho-ortho'-dihydroxyazo grouping.

Instead of the reactive component of the Formula V it is also possible to employ cyanuric chloride or bromide and to replace afterward one of the remaining chlorine or bromine atoms by the radical X.

A modification of this procedure consists in coupling in ortho-position to the hydroxy group 1 mole of the diazo compound of an amine of the Formula III with 1 mole of a coupling component of the formula

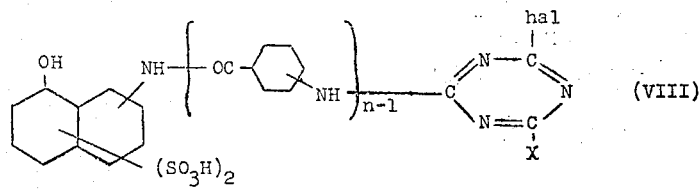

and treating the monoazo dyestuff with a chromium- or cobalt-yielding agent.

Instead of the coupling component of the Formula VIII it is also possible to utilize a coupling component of the formula

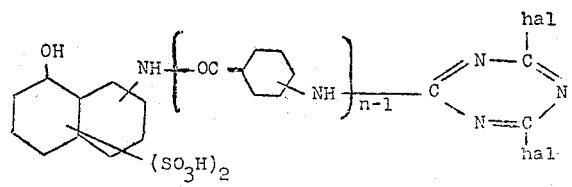

and afterward to replace one of the halogen atoms by the radical X.

Suitable 2-amino-1-hydroxybenzenes of the Formula III are e.g. 2-amino-1-hydroxy-4-chloro, -4-bromo- or -4-nitro-benzene, 2 - amino-1-hydroxy-5-nitro-benzene, 2-amino-1-hydroxy-4,5-dichloro- and -4,6-dichlorobenzene, 2-amino-1 - hydroxy-3,4,6-trichlorobenzene, 2-amino-1-hydroxy-4-chloro - 5-nitro-, -4-chloro-6-nitro- and -4-nitro-6-chloro-benzene and 2-amino-1-hydroxy-4,6-dinitrobenzene.

The coupling components used as starting materials are the 1 - amino-8-hydroxynaphthalene-3,6- and -4,6-disulfonic acids, 2-amino-8-hydroxynaphthalene-3,6-disulfonic acid, and the derivatives of these acids in which the amino group is acylated by an aminobenzoyl radical.

The radical X is e.g. an amino group, a lower alkyl-amino group (methylamino, ethylamino, n- or iso-propyl-amino, n-, iso- or sec. butylamino, n- or isoamylamino), a di-(lower alkyl)- amino group (dimethylamino, diethyl-amino), a lower hydroxyalkylamino group (2-hydroxy-ethylamino, 2- or 3-hydroxypropylamino), a di-(lower hydroxyalkyl)-amino group [di-(2-hydroxyethyl)-amino, di-(2-hydroxypropyl)-amino], a lower alkoxyalkylamino group (2-methoxyethylamino, 2-ethoxyethylamino, 2- or 3-methoxypropylamino, 3- or 4-methoxybutylamino), a lower carboxyalkylamino group (carboxymethylamino, α- and β-carboxyethylamino), a N-lower-alkyl-N-lower carboxyalkylamino group (N - methyl - N-carboxymethylamino), a lower sulfoalkylamino group (β-sulfo-ethyl-amino), a N-lower alkyl-N-lower sulfoalkyl-amino group (N-methyl- or N - ethyl -N-sulfoethylamino), a phenyl-amino group, a N-lower alkyl-N-phenylamino group (N-methyl- or N-ethyl-N-phenylamino), a N-lower hydroxy-alkyl-N-phenylamino group (N-β-hydroxyethyl-N-phenyl-amino), a carboxyphenylamino group (2-, 3- or 4-car-boxyphenylamino), a mono- or disulfophenylamino group (2-, 3- or 4-monosulfophenylamino, 2,4-, 2,5- or 3,5-disulfophenylamino), a mono- or disulfonaphthyl-amino group (4-, 6- or 7-sulfo-, -3,6-, -4,6-, -4,7- or -5,7-disulfonaphthyl-1-amino, 5-, 6-, 7- or 8-sulfo-, -4,7-, -4,8-, -6,8- or -5,7-disulfo-naphthyl-2-amino), a lower alkylphenylamino group (2-, 3- or 4-methyl- or -ethyl-phenylamino), a lower alkoxyphenylamino group (2-, 3- or 4-methoxy- or -ethoxyphenylamino), a chlorophenyl-amino group (2-, 3- or 4-chlorophenylamino), a cyclo-hexylamino group, a methylcyclohexylamino group (2-, 3- or 4-methylcyclohexylamino) or a benzylamino group.

The reaction of the reactive component of Formula V with the amino group of the coupling component of Formula IV or of the monoazo dyestuff of Formula VII is carried out e.g. at temperatures of about 30° to 60° C. and in the pH-range of about 3 to 7, preferably at 4 to 6, in the presence of an acid-binding agent which can be added in the form of a powder or of an aqueous solution. Examples of suitable binding agents are e.g. sodium acetate, bicarbonate, carbonate or hydroxide or the corresponding potassium or lithium compounds. It is also possible to react the amino group first with cyanuric chloride or bromide e.g. at a temperature of 0 to about 10° C. and a pH value comprised between about 3 to 7, and then to react one of the remaining chlorine or bromine atoms with ammonia or a primary or secondary amine, the reaction being carried out under the same conditions as described above for the reactive component of Formula V or with two equivalents of amine, especially ammonia, which acts at the same time as amine and as acid-binding agent. The addition of small amounts of a wetting or emulsifying agent to the reaction mixture can accelerate the rate of reaction.

The coupling of the diazo compound of an amine of the Formula III with a coupling component of Formula VIII is carried out in alkaline medium, preferably at temperatures of 0–10° C.

The monoazo dyestuffs are converted into their chromium or cobalt complex compounds preferably in aqueous solution or in an organic medium, e.g. formamide, or in the concentrated aqueous solution of an alkali metal salt of a low molecular aliphatic monocarboxylic acid. It is of advantage to proportion the reactants so that an amount of metal-yielding agent containing less than two but at least one atom of metal acts upon two molecules of the monoazo dyestuff.

Suitable chromium compounds are e.g. chromic fluoride, chromic sulfate, chromic formate, chromic acetate, chromic potassium sulfate or chromic ammonium sulfate. The chromates, e.g. sodium or potassium chromate or bichromate, are also eminently suitable for metallizing the monoazo dyestuffs. It is advantageous to work here in a strongly caustic alkaline medium, to which reducing substances may be added if desired.

Cobaltous formate, cobaltous acetate and cobaltous sulfate are examples of suitable cobalt compounds. If metallization is effected in the concentrated aqueous solution of an alkali metal salt of a low molecular aliphatic monocarboxylic acid, water-insoluble metal compounds can be used, e.g. cobalt hydroxide or cobalt carbonate.

It is especially advantageous to carry out metallization in aqueous or alkaline medium to which the metal compounds are added in presence of compounds which maintain the metal dissolved in complex combination in caustic alkaline medium; examples of such compounds are tartaric acid, citric acid and lactic acid.

The metal complex compounds obtained are precipitated from aqueous medium by the addition of salt, if desired after running the organic metallizing solution into brine, and are subsequently filtered off, washed if necessary and dried.

The metal-containing azo dyestuffs thus obtained are homogenous metal complex compounds in which essentially one atom of metal is linked to two molecules of the monoazo compound. The metal complex compounds are so-called 2:1 complexes in which one molecule of the monoazo compound is linked with approximately 0.3 to 0.7 atom of metal.

The new chromium- or cobalt-containing reactive dyestuffs are suitable for dyeing, padding or printing fibers of natural cellulose (e.g. cotton, linen, hemp) or of regenerated cellulose (viscose filament yarn and staple fiber, cuprammonium rayon) in violet, dark blue and black shades.

The dyestuffs are dyed, padded, printed or fixed on cellulose fibers in an alkaline medium, e.g. in presence of sodium carbonate or bicarbonate, sodium or potassium hydroxide solution, sodium metasilicate, sodium borate, trisodium phosphate, ammonia etc. It is often an advantage to add a mild oxidizing agent such as sodium 1-nitrobenzene-3-sulfonate to the dyebath, padding liquor or printing paste, in order to preclude reduction effects. Normally, the dyestuffs are fixed on cellulosic fibers by heat treatment.

If strong alkalis such as sodium or potassium metasilicate or hydroxide are employed it is also possible to fix the dyestuffs to the cellulose fibers at lower temperatures e.g. 20° to 40° C., with fixation times varying from several hours for light shades to about 50 hours for strong shades.

The dyeings and prints on cellulose fibers are notable for their excellent fastness to wet agencies, which is due to the formation of a stable chemical linkage between the dyestuff molecule and the cellulose molecule. Often the total amount of dyestuff applied does not take part in the reaction with the fiber and in such cases the unreacted dyestuff is removed from the fiber by suitable after-treatment, e.g. washing and/or soaping, if necessary at higher temperatures. For this purpose synthetic detergents can be used, e.g. alkylarylsulfonates, sodium lauryl sulfate, sodium lauryl polyglycol ether sulfate and mono- and dialkylphenylpolyglycol ethers.

The new dyestuffs are well soluble in water giving solutions stable to salts and to hard water and therefore possess the great advantage that the non-fixed portion of dyestuff can be easily washed out of the prints or pad-dyeings and that the printing pastes or padding liquors are stable to storage.

The possibility given by the substituent X and the bridge member

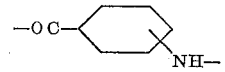

of increasing the molecular weight and/or the number of water-solubilizing groups permits to adapt each dyestuff to the particular application intended. For instance a dyestuff which contains the bridge member

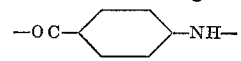

and as X an amino group or a methylamino group is suitable for the exhaustion dyeing process, whereas for padding or printing purposes a dyestuff in which $n$ is 1 and X is an amino group or a methyl amino group or $n$ is 2 and X is a sulfoethylamino or a sulfophenylamino group is preferred.

The dyeings and prints on fibers of natural or regenerated cellulose are notable for their excellent fastness to light, washing, water, perspiration, alkali, organic acids such as acetic acid and tartaric acid, crocking and dry cleaning.

The dyestuffs reserve acetate, triacetate and polyethylene terephthalate fibers.

In the following examples the parts and percentages are by weight and the temperatures in degrees centigrade.

*Example 1*

52.8 parts of the monoazo dyestuff sodium 1-hydroxy-2 - (2' - hydroxy-5'-nitrophenylazo)-8-aminonaphthalene-3,6-disulfonate are suspended in 300 parts of water at 75°. A solution of 14.5 parts of cobaltous sulfate heptahydrate in 40 parts of water is dropped into the suspension in the course of 30 minutes and at the same time a dilute sodium carbonate solution is dropped in to maintain the pH value of the reaction mass between 5.0 and 6.0. After the addition of the cobaltous sulfate solution the mass is stirred for a further hour at 75°, after which the dyestuff is precipitated with sodium chloride and filtered off.

The cobalt complex compound is dissolved in 300 parts of water and at 40°, 34.5 parts of sodium 3-(4',6'-dichloro - 1',4',5' - triazinyl-2'-amino)-benzene-1-sulfonate are added. The pH value of the reaction solution is maintained between 4.0 and 6.0 by dropwise addition of a dilute sodium carbonate solution. After stirring for 4 hours at 40–45° condensation is completed. By the addition of sodium chloride the dyestuff is precipitated and is then filtered off and dried in vacuo. It is a dark powder which dissolves in water with a dark blue coloration.

Cotton cretonne is printed at room temperature with a paste of the following composition:

| | Parts |
|---|---|
| Dyestuff obtained according to the foregoing details | 65 |
| Urea | 100 |
| Water | 355 |
| Sodium alginate thickening (3%) | 450 |
| Sodium 1-nitrobenzene-3-sulfonate | 10 |
| Sodium bicarbonate | 20 |
| | 1000 |

The printed fabric is dried at 50°, steamed for 10 minutes at 102–104°, rinsed in cold and warm water, soaped at the boil, rinsed again and dried. A reddish black print with good light and wet fastness is obtained.

*Example 2*

51.8 parts of the dyestuff sodium 1-hydroxy-2-(2'-hydroxy - 5' - chlorophenylazo) - 8-aminonaphthalene-3,6-disulfonate are stirred into 350 parts of water. At 80°, 30 parts of crystallized sodium acetate and 30 parts of crystallized chromic potassium sulfate are added and the mixture is heated for 24 hours with reflux. Subsequently the dyestuff solution is cooled to 45°, 16.5 parts of 2-amino - 4,6 - dichloro - 1,3,5-triazine are added and it is stirred for a few hours at 50° with dropwise addition of dilute sodium carbonate solution to maintain the pH value at 4.5–5.5. On completion of condensation the dyestuff is precipitated at 50° by the addition of sodium chloride and filtered off, dried and ground. It is a black powder which dissolves in water to give dark blue solution.

A cotton fabric is impregnated on a pad with a solution of

| | Parts |
|---|---|
| Above-described dyestuff | 8 |
| Urea | 20 |
| Sodium carbonate | 2 |
| Water | 100 | passed between squeeze rollers to give an increase of about 70% on its dry weight and then dried. The dyeing is fixed by treatment in dry heat for 4–5 minutes at 140–150°, rinsed cold and warm, soaped at the boil for 15 minutes with a 0.2% solution of a nonionic detergent, and finally rinsed and dried. A navy blue shade fast to boiling is obtained.

*Example 3*

34.1 parts of the monosodium salt 1-amino-8-hydroxynaphthalene-3,6-disulfonic acid are dissolved in 200 parts of water by the addition of dilute sodium hydroxide solution at 50° and a pH value of 4.8–5.0. With vigorous stirring 16.5 parts of 2-amino-4,6-dichloro-1,3,5-triazine are added, then the reaction medium is heated at 60° for 5–6 hours, during which time its pH is maintained at 4.0–4.2 by dropping in dilute sodium carbonate solution. On completion of condensation the reaction mass is brought to a temperature of 20° by external cooling and 10.6 parts of sodium carbonate in 50 parts of water are added. Over the next 15 minutes this solution is run into a suspension obtained by diazotization of 14.4 parts of 2-amino-1-hydroxy-4-chlorobenzene and neutralized with sodium carbonate. After stirring overnight the monoazo dyestuff is filtered off and the residue washed with water. The dyestuff paste is suspended in 500 parts of water at 80° and at this temperature 16 parts of cobaltous sulfate heptahydrate are added. The temperature is subsequently maintained at 94–97° for 2½ hours, a constant pH of 5.0–6.0 being maintained by dropwise addition of a dilute sodium carbonate solution. The dyestuff is precipitated by the addition of sodium chloride, filtered off, dried at 70° and ground to give a dark powder which dissolves in water with a blue coloration.

Mercerized cotton sateen is printed with a paste of the following composition:

| | Parts |
|---|---|
| Dyestuff obtained according to the foregoing details | 60 |
| Urea | 100 |
| Water | 360 |
| Sodium alginate thickening (3%) | 450 |
| Sodium 1-nitrobenzene-3-sulfonate | 15 |
| Sodium carbonate | 15 |
| | 1000 |

The print is dried, steamed for 10 minutes at 102–104°, rinsed in cold and warm water, soaped at the boil, rinsed again and dried. It is of a reddish navy blue shade possessing good light and wet fastness.

*Example 4*

The 1:2-chromium complex compound obtained from 51.8 parts of the dyestuff sodium 1-hydroxy-2-(2'-hydroxy-5'-chloro-phenylazo)-8-amino-naphthalene-3,6 - disulfonate as described in Example 2 is dissolved at 20° in 400 parts of water and the solution is cooled to 0°. 18.5 parts of finely dispersed cyanuric chloride are added and the pH value of the reaction solution is maintained between 3.0 and 4.0 by dropwise addition of a dilute sodium carbonate solution. After stirring for 3 hours at 0°, condensation is completed. The solution is heated to 45° and 17.3 parts of 3-aminobenzene-1-sulfonic acid dissolved in 100 parts of water and the requisite amount of sodium hydroxide solution to give the pH value 6.0 are added. The pH value of the reaction solution is maintained between 5.0 and 6.0 by dropping in a dilute sodium carbonate solution. After stirring for 1 hour at 45° condensation is completed. The dyestuff is precipitated by the addition of sodium chloride and filtered off. On drying it is obtained as a dark powder which dissolves in water with a dark blue coloration.

Mercerised cotton sateen is printed with a paste of the following composition:

| | Parts |
|---|---|
| Dyestuff obtained according to the foregoing details | 65 |
| Urea | 100 |
| Water | 353 |
| Sodium alginate thickening (3%) | 450 |
| Potassium carbonate | 20 |
| Sodium hydroxide solution (30%) | 2 |
| Sodium 1-nitrobenzene-3-sulfonate | 10 |
| | 1000 |

The dried print is steamed for 10–15 minutes at 102–104° and subsequently rinsed in cold and warm water, soaped at the boil, rinsed again and dried. A navy blue print with good light and wet fastness is obtained.

*Example 5*

13.6 parts of 25% ammonia are added to the solution of the 1:2-chromium complex compound of sodium 1-hydroxy - 2 - (2' - hydroxy - 5' - chlorophenylazo) - 8-(4'',6'' - dichloro - 1'',3'',5'' - triazinyl - 2'' - amino)-naphthalene-3,6-disulfonate obtained as described in Example 4.

The mixture is then heated to 35–40° and held for 2–3 hours at 40° until the reaction is completed. The obtained dyestuff is identical to that of Example 2.

Viscose staple fiber is printed at room temperature with a paste of the following composition:

| | Parts |
|---|---|
| Above dyestuff | 50 |
| Urea | 200 |
| Water | 275 |
| Sodium alginate thickening (4%) | 450 |
| Sodium 1-nitrobenzene-3-sulfonate | 10 |
| Sodium carbonate | 15 |
| | 1000 |

The print is dried and treated in dry heat for 1 minute at 200° or 10 minutes at 120°, then rinsed in cold and warm water and soaped at the boil. After further rinsing and drying a navy blue print of good light and wet fastness is obtained.

The following table gives details of further chromium- or cobalt-containing reactive dyestuffs which were obtained according to the details of Examples 1 to 5 and are derived from monoazo dyestuffs of the Formula I. In the table they are characterized by the diazo and coupling components in Columns (I) and (II), by the meanings of hal and X in Columns (III) and (IV), by the metal used for metal complex formation in Column (V) and by the shade of the pad dyeings and prints on cotton in Column (VI).

| Ex. No. | Diazo Component (I) | Coupling Component (II) | Metal (III) | Hal (IV) | X (V) | Shade on Cotton (VI) |
|---|---|---|---|---|---|---|
| 6 | 1-amino-2-hydroxy-5-nitrobenzene. | 1-hydroxy-8-aminonaphthalene-3,6-disulfonic acid. | Co | Cl | 4-sulfophenylamino | Reddish black. |
| 7 | ----do---- | ----do---- | Co | Cl | Amino | Do. |
| 8 | ----do---- | ----do---- | Cr | Cl | ----do---- | Do. |
| 9 | ----do---- | 1-hydroxy-8-(4'-aminobenzoyl-amino)-naphthalene-3,6-disulfonic acid. | Cr | Cl | ----do---- | Greenish black. Do. |
| 10 | 1-amino-2-hydroxy-5-chlorobenzene. | ----do---- | Co | Cl | Methylamino | Navy blue. |
| 11 | ----do---- | ----do---- | Co | Cl | 2-sulfoethylamino | Do. |
| 12 | ----do---- | 1-hydroxy-8-aminonaphthalene-3,6-disulfonic acid. | Cr | Cl | 4-sulfophenylamino | Do. |
| 13 | ----do---- | ----do---- | Cr | Br | ----do---- | Do. |
| 14 | ----do---- | ----do---- | Co | Cl | Ethylamino | Reddish navy blue. |
| 15 | ----do---- | ----do---- | Co | Cl | 4-methoxyphenylamino | Do. |
| 16 | ----do---- | ----do---- | Co | Cl | 2-carboxy-ethylamino | Do. |
| 17 | 1-amino-2-hydroxy-5-chloro-3-nitrobenzene. | ----do---- | Cr | Cl | N-methyl-N-2-sulfoethylamino. | Navy blue. |
| 18 | ----do---- | ----do---- | Co | Cl | 2,5-disulfophenylamino | Reddish navy blue. |
| 19 | 1-amino-2-hydroxy-3,5-dinitrobenzene. | ----do---- | Co | Cl | Dimethylamino | Reddish black. |
| 20 | ----do---- | ----do---- | Cr | Cl | Phenylamino | Greenish black. |
| 21 | ----do---- | 1-hydroxy-8-amino-naphthalene-3,5-disulfonic acid. | Co | Cl | 2-hydroxyethylamino | Reddish black. |
| 22 | 1-amino-2-hydroxy-5-chloro-4-nitrobenzene. | ----do---- | Co | Cl | 4-sulfonaphthyl-1-amino | Do. |
| 23 | ----do---- | ----do---- | Cr | Cl | n-Propylamino | Greenish black. |
| 24 | ----do---- | 1-hydroxy-7-aminonaphthalene-3,6-disulfonic acid. | Cr | Cl | Amino | Do. |
| 25 | 1-amino-2-hydroxy-5-nitrobenzene. | ----do---- | Cr, Co | Cl, Cl | 2-hydroxyethylamino, ----do---- | Gray. Brownish violet. |
| 26 | 1-amino-2-hydroxy-5-chlorobenzene. | ----do---- | Co | Cl | 3-hydroxypropylamino | Violet |
| 27 | 1-amino-2-hydroxy-5-chloro-3-nitrobenzene. | ----do---- | Cr | Cl | 4-sulfophenylamino | Navy blue. |
| 28 | 1-amino-2-hydroxy-3-chloro-5-nitrobenzene. | ----do---- | Cr | Cl | 3-sulfophenylamino | Bluish gray. |
| 29 | 1-amino-2-hydroxy-3,5-dinitrobenzene. | ----do---- | Cr | Cl | Methylamino | Do. |
| 30 | 1-amino-2-hydroxy-nitrobenzene. | 1-hydroxy-8-aminonaphthalene-3,5-disulfonic acid. | Cr | Cl | 3-hydroxybutylamino | Greenish black. |
| 31 | ----do---- | ----do---- | Cr | Cl | 2-methylphenylamino | Do. |
| 32 | ----do---- | ----do---- | Co | Br | Methylamino | Do. |
| 33 | 1-amino-2-hydroxy-3,5-dinitrobenzene. | ----do---- | Cr | Cl | Diethylamino | Bluish black. |
| 34 | ----do---- | ----do---- | Cr | Cl | 2-ethoxyethylamino | Do. |
| 35 | 1-amino-2-hydroxy-4-nitrobenzene. | ----do---- | Cr | Cl | 2-hydroxypropylamino | Greenish black. |
| 36 | ----do---- | 1-hydroxy-8-amino-naphthalene-3,6-disulfonic acid. | Cr | Cl | 4-methylphenylamino | Do. |
| 37 | ----do---- | ----do---- | Co | Cl | 2-carboxyphenylamino | Reddish black. |
| 38 | 1-amino-2-hydroxy-5-nitrobenzene. | ----do---- | Co | Cl | 3-chlorophenylamino | Do. |
| 39 | ----do---- | ----do---- | Co | Cl | Benzylamino | Do. |
| 40 | ----do---- | ----do---- | Cr | Cl | n-Amylamino | Greenish black. |
| 41 | ----do---- | ----do---- | Cr | Cl | 8-sulfonaphthyl-2-amino | Do. |
| 42 | ----do---- | ----do---- | Cr | Br | Di-(2-hydroxyethyl)-amino. | Do. |
| 43 | 1-amino-2-hydroxy-3,5,6-trichloro-benzene. | ----do---- | Cr | Cl | Amino | Navy blue. |
| 44 | ----do---- | 1-hydroxy-8-aminonaphthalene-3,5-disulfonic acid. | Cr | Cl | Dimethylamino | Do. |
| 45 | 1-amino-2-hydroxy-3,5-dichlorobenzene. | ----do---- | Cr | Cl | Phenylamino | Do. |
| 46 | ----do---- | 1-hydroxy-8-aminonaphthalene-3,6-disulfonic acid. | Co | Cl | N-methyl-N-phenylamino | Do. |
| 47 | ----do---- | ----do---- | Cr | Cl | Carboxymethylamino | Do. |
| 48 | ----do---- | 1-hydroxy-7-amino-naphthalene-3,6-disulfonic acid. | Cr | Cl | Ethylamino | Do. |
| 49 | 1-amino-2-hydroxy-4,5-dichlorobenzene. | 1-hydroxy-8-aminonaphthalene-3,6-disulfonic acid. | Cr | Cl | 3-methoxypropylamino | Navy blue. |
| 50 | ----do---- | ----do---- | Co | Cl | Amino | Reddish navy blue. |
| 51 | 1-amino-2-hydroxy-5-bromobenzene. | ----do---- | Cr | Cl | Di-(2-hydroxyethyl)amino. | Navy blue. |
| 52 | ----do---- | ----do---- | Co | Cl | Amino | Reddish navy blue. |
| 53 | ----do---- | 1-hydroxy-8-aminonaphthalene-3,5-disulfonic acid. | Co | Cl | n-Butylamino | Do. |
| 54 | 1-amino-2-hydroxy-5-chlorobenzene. | 1-hydroxy-8-(4'-aminobenzoyl-amino)-naphthalene-3,5-disulfonic acid. | Co | Cl | N-methyl-N-2-sulfoethylamino. | Do. |
| 55 | ----do---- | ----do---- | Cr | Cl | 4,7-disulfonaphthyl-2-amino | Navy blue. |
| 56 | ----do---- | ----do---- | Cr | Cl | 4,6-disulfonaphthyl-1-amino | Do. |
| 57 | 1-amino-2-hydroxy-5-nitrobenzene. | ----do---- | Cr | Cl | 2,4-disulfophenylamino | Greenish black. |
| 58 | ----do---- | 1-hydroxy-8-(3'-aminobenzoyl-amino)-naphthalene-3,6-disulfonic acid. | Cr | Cl | 5,8-monosulfonaphthyl-2-amino. | Do. |
| 59 | ----do---- | ----do---- | Co | Cl | Di-(2-hydroxypropyl)-amino | Reddish black. |
| 60 | ----do---- | ----do---- | Co | Br | 3-sulfophenylamino | Do. |
| 61 | ----do---- | ----do---- | Cr | Cl | 2-hydroxypropylamino | Greenish black. |
| 62 | ----do---- | ----do---- | Cr | Cl | N-methyl-N-carboxymethylamino. | Do. |

| Ex. No. | Diazo Component (I) | Coupling Component (II) | Metal (III) | Hal (IV) | X (V) | Shade on Cotton (VI) |
|---|---|---|---|---|---|---|
| 63 | 1-amino-2-hydroxy-5-chlorobenzene. | 1-hydroxy-8-(3'-aminobenzoylamino)-naphthalene-3,6-disulfonic acid. | Cr | Cl | 4,8-disulfonaphthyl-2-amino. | Navy blue. |
| 64 | ....do.... | ....do.... | Co | Cl | 4-carboxyphenylamino | Reddish navy blue. |
| 65 | ....do.... | 1-hydroxy-8-(3'-aminobenzoylamino)-naphthalene-3,5-disulfonic acid. | Co | Cl | 6-sulfonaphthyl-2-amino | Do. |
| 66 | ....do.... | ....do.... | Cr | Cl | Methylamino | Navy blue. |
| 67 | 1-amino-2-hydroxy-5-chloro-3-nitro-benzene. | ....do.... | Cr | Cl | 6,7-monosulfo-naphthyl-1-amino. | Do. |
| 68 | 1-amino-2-hydroxy-5-nitrobenzene. | ....do.... | Cr | Cl | 6,8-disulfonaphthyl-2-amino. | Greenish black. |
| 69 | ....do.... | 1-hydroxy-7-(3'-aminobenzoylamino)-naphthalene-3,6-disulfonic acid. | Cr | Cl | 3-sulfophenylamino | Do. |
| 70 | ....do.... | ....do.... | Co | Cl | Amino | Reddish black. |
| 71 | 1-amino-2-hydroxy-5-chlorobenzene. | ....do.... | Co | Cl | 4,7-disulfonaphthyl-1-amino. | Reddish navy blue. |
| 72 | ....do.... | ....do.... | Co | Cl | 6-sulfonaphthyl-1-amino | Do. |
| 73 | ....do.... | 1-hydroxy-7-(4'-aminobenzoylamino)-naphthalene-3,6-disulfonic acid. | Cr | Cl | 7-sulfonaphthyl-1-amino | Navy blue. |
| 74 | ....do.... | ....do.... | Co | Cl | 2-sulfoethylamino | Reddish navy blue. |
| 75 | 1-amino-2-hydroxy-5-nitrobenzene. | ....do.... | Co | Cl | 3,6-disulfonaphthyl-1-amino. | Reddish black. |
| 76 | 1-amino-2-hydroxy-5-chloro-3-nitrobenzene. | 1-hydroxy-8-aminonaphthalene-3,6-disulfonic acid. | Cr | Cl | Amino | Violet. |
| 77 | ....do.... | 1-hydroxy-8-aminonaphthalene-3,5-disulfonic acid. | Cr | Cl | 2-methoxyethylamino | Navy blue. |
| 78 | ....do.... | ....do.... | Cr | Br | Amino | Do. |
| 79 | 1-amino-2-hydroxy-5-chlorobenzene. | ....do.... | Cr | Cl | 4-methylcyclohexylamino | Do. |
| 80 | ....do.... | ....do.... | Cr | Cl | N-2-hydroxyethyl-N-phenylamino. | Do. |
| 81 | 1-amino-2-hydroxy-5-nitrobenzene. | ....do.... | Co | Cl | 3-methoxybutylamino | Reddish black. |
| 82 | ....do.... | 1-hydroxy-8-aminonaphthalene-3,6-disulfonic acid. | Co | Cl | 4-chlorophenylamino | Do. |
| 83 | ....do.... | ....do.... | Cr | Cl | 4-ethoxyphenylamino | Greenish black. |
| 84 | ....do.... | ....do.... | Cr | Cl | 3-methylphenylamino | Do. |
| 85 | ....do.... | ....do.... | Cr | Cl | 2-methoxypropylamino | Do. |
| 86 | ....do.... | ....do.... | Cr | Cl | 7-sulfonaphthyl-2-amino | Do. |
| 87 | ....do.... | ....do.... | Cr | Cl | N-ethyl-N-phenylamino | Do. |
| 88 | 1-amino-2-hydroxy-5-chlorobenzene. | ....do.... | Cr | Cl | N-ethyl-N-2-sulfoethylamino. | Navy blue. |
| 89 | ....do.... | ....do.... | Cr | Cl | Isoamylamino | Do. |
| 90 | 1-amino-2-hydroxy-3-chloro-5-nitrobenzene. | ....do.... | Cr | Cl | 5-sulfonaphthyl-1-amino | Do. |
| 91 | 1-amino-2-hydroxy-4-nitrobenzene. | ....do.... | Cr | Cl | Amino | Greenish black. |
| 92 | ....do.... | ....do.... | Co | Cl | Cyclohexylamino | Reddish black. |
| 93 | 1-amino-2-hydroxy-5-nitrobenzene. | ....do.... | Co | Cl | Sec-butylamino | Do. |
| 94 | ....do.... | ....do.... | Co | Cl | N-methyl-N-2-carboxyethylamino. | Do. |
| 95 | ....do.... | ....do.... | Cr | Cl | 5-sulfonaphthyl-1-amino | Greenish black. |
| 96 | ....do.... | 1-hydroxy-8-(4'-aminobenzoylamino)-naphthalene-3,6-disulfonic acid. | Cr | Cl | 3,5-disulfophenylamino | Do. |
| 97 | ....do.... | ....do.... | Cr | Cl | 5,7-disulfonaphthyl-1-amino | Do. |
| 98 | ....do.... | ....do.... | Co | Cl | 5,7-disulfonaphthyl-2-amino | Reddish black. |
| 99 | 1-amino-2-hydroxy-5-chlorobenzene. | 1-hydroxy-8-aminonaphthalene-3,6-disulfonic acid. | Co | Cl | Isopropylamino | Reddish navy blue. |
| 100 | ....do.... | ....do.... | Co | Cl | 4-methoxybutylamino | Do. |
| 101 | ....do.... | ....do.... | Co | Cl | 2-methoxyphenylamino | Do. |
| 102 | ....do.... | ....do.... | Cr | Cl | 3-carboxyphenylamino | Navy blue. |
| 103 | ....do.... | ....do.... | Cr | Cl | 4-ethylphenylamino | Do. |
| 104 | ....do.... | ....do.... | Co | Cl | Isobutylamino | Do. |
| 105 | ....do.... | ....do.... | Co | Cl | 2-hydroxy-3-sulfopropylamino. | Do. |

Formulae of representative dyestuffs of the foregoing examples are as follow:

*Example 1*

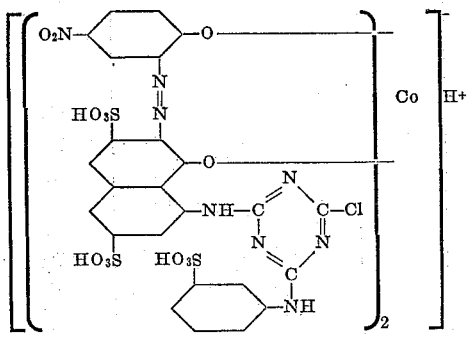

*Examples 2 and 5*

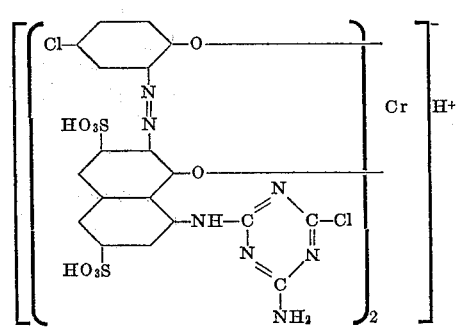

Example 3

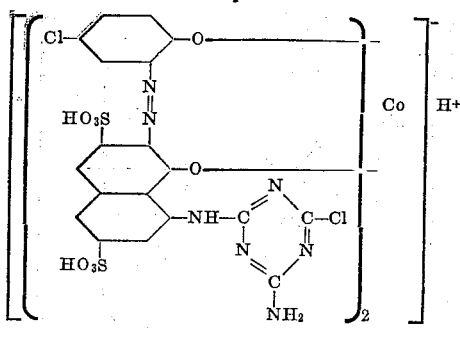

Example 4

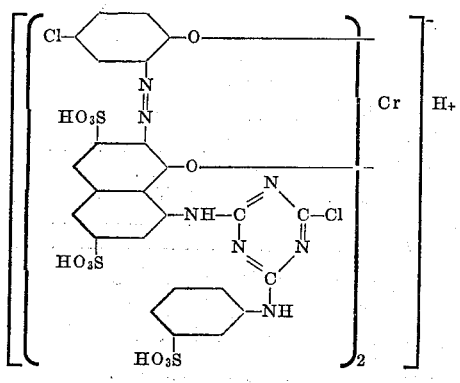

Example 7

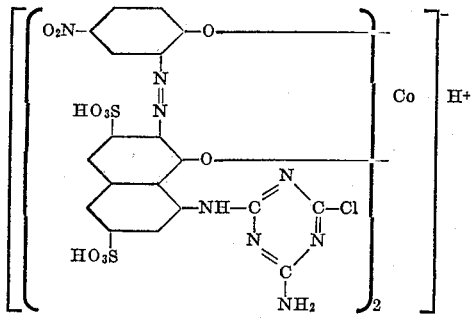

Example 8

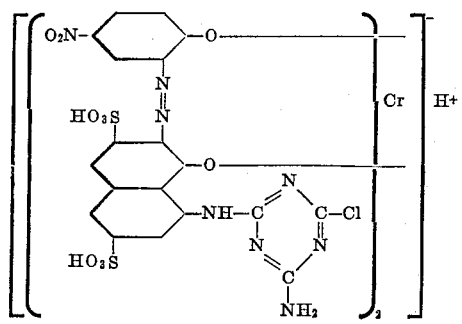

Example 76

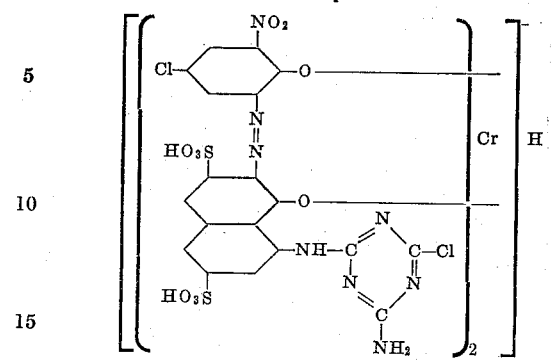

Having thus disclosed the invention what we claim is:

1. A member selected from the group consisting of the 1:2-chromium and the 1:2-cobalt complex compounds of the monoazo dyestuff of the formula

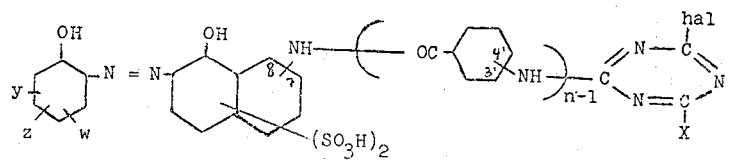

wherein $w$ is a member selected from the group consisting of hydrogen and chlorine, $y$ is a member selected from the group consisting of hydrogen, chlorine, and nitro, $z$ is a member selected from the group consisting of hydrogen, chlorine, bromine and nitro, at least one of $w$, $y$ and $z$ being different from hydrogen, hal is a member selected from the group consisting of chlorine and bromine, X is a member selected from the group consisting of amino, lower alkylamino, di-(lower alkyl)-amino, lower hydroxyalkylamino, di-(lower hydroxyalkyl)-amino, lower alkoxy-lower alkylamino, lower carboxyalkylamino, N-lower alkyl-N-lower carboxyalkylamino, lower sulfoalkylamino, lower hydroxysulfoalkylamino, N-lower alkyl-N-lower sulfoalkylamino, phenylamino, N-lower alkyl-N-phenylamino, N-lower hydroxyalkyl-N-phenylamino, carboxyphenylamino, monosulfophenylamino, disulfophenylamino, monosulfonaphthylamino, disulfonaphthylamino, lower alkylphenylamino, lower alkoxyphenylamino, chlorophenylamino, cyclohexylamino, methylcyclohexylamino and benzylamino, $n$ is one of the integers 1 and 2, the group

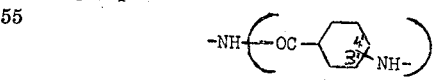

is attached to the naphthalene nucleus in one of the positions 7 and 8 and the —NH— group is attached to one of the positions 3' and 4' of the phenylene nucleus.

2. The dyestuff of the formula

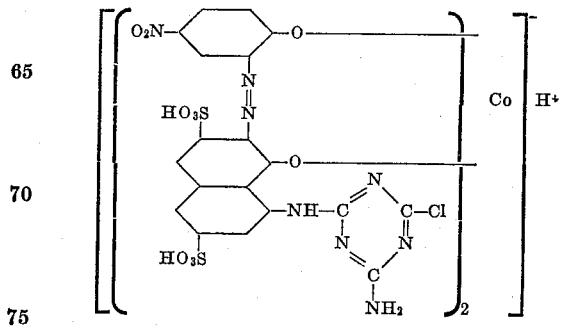

3. The dyestuff of the formula
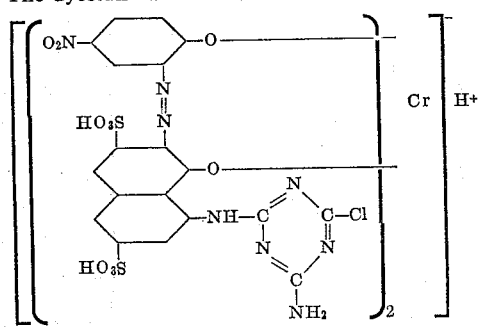
4. The dyestuff of the formula
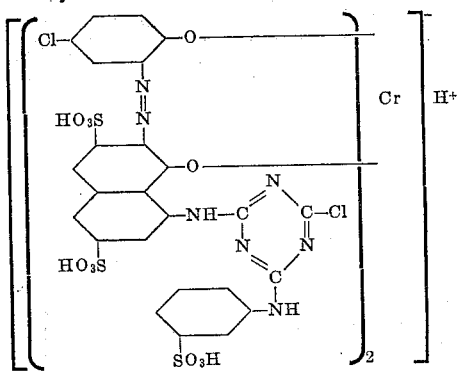
5. The dyestuff of the formula
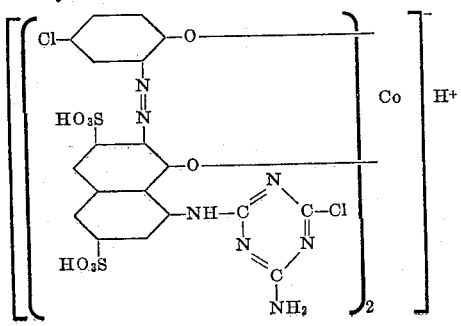
6. The dyestuff of the formula
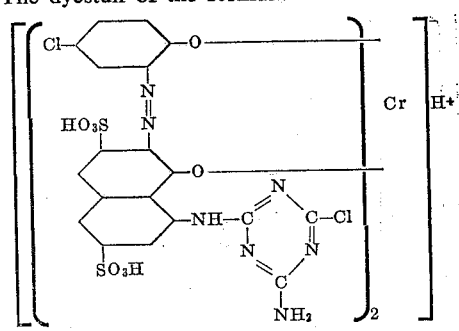
7. The dyestuff of the formula
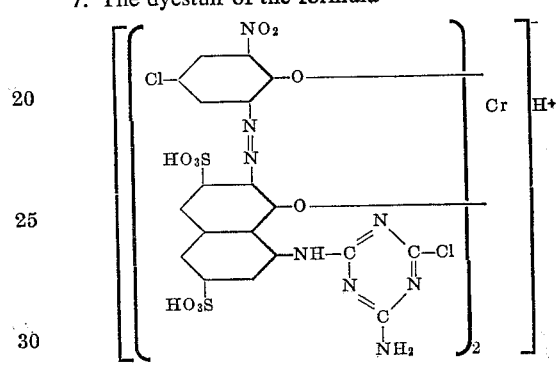
References Cited
UNITED STATES PATENTS
| | | | |
|---|---|---|---|
| 2,873,269 | 2/1959 | Fasciati et al. | 260—153 |
| 2,943,084 | 6/084 | Buehler et al. | 260—145 |
| 2,929,809 | 3/1960 | Menzi et al. | 260—146 |
| 3,065,221 | 11/1962 | Vellins | 260—146 |
| 3,133,909 | 5/1964 | Riat | 260—146 |
FOREIGN PATENTS
| | | |
|---|---|---|
| 850,559 | 10/1960 | Great Britain. |
| 907,815 | 10/1962 | Great Britain. |
FLOYD D. HIGEL, *Primary Examiner.*